US011598609B1

(12) United States Patent
Gutin

(10) Patent No.: US 11,598,609 B1
(45) Date of Patent: Mar. 7, 2023

(54) WIDE-ANGLE SEEKER

(71) Applicant: Applied Science Innovations, Inc., Troy, NY (US)

(72) Inventor: Mikhail Gutin, Wynantskill, NY (US)

( * ) Notice: Subject to any disclaimer, the term of this patent is extended or adjusted under 35 U.S.C. 154(b) by 2344 days.

(21) Appl. No.: 14/656,293

(22) Filed: Mar. 12, 2015

Related U.S. Application Data

(60) Provisional application No. 61/955,462, filed on Mar. 19, 2014.

(51) Int. Cl.
*F41G 7/22* (2006.01)
*G01S 17/66* (2006.01)
*G01S 17/06* (2006.01)
*G01S 17/88* (2006.01)

(52) U.S. Cl.
CPC .......... *F41G 7/226* (2013.01); *F41G 7/2293* (2013.01); *G01S 17/06* (2013.01); *G01S 17/66* (2013.01); *G01S 17/88* (2013.01)

(58) Field of Classification Search
CPC ...... F41G 7/2253; F41G 7/226; F41G 7/2293; G01S 3/782; G01S 3/783; G01S 3/7835; G02B 19/0019; G02B 19/0023
See application file for complete search history.

(56) References Cited

U.S. PATENT DOCUMENTS

| | | | | |
|---|---|---|---|---|
| 2,969,018 A * | 1/1961 | Bowden | ................ | F41G 7/2253 |
| | | | | 244/3.16 |
| 3,343,445 A * | 9/1967 | Norman | ................... | B64G 1/24 |
| | | | | 250/203.1 |
| 3,653,737 A * | 4/1972 | Stripling | ............... | F41G 7/2213 |
| | | | | 250/236 |
| 3,872,308 A * | 3/1975 | Hopson | ................. | F41G 7/2213 |
| | | | | 244/3.16 |
| 4,245,890 A | 1/1981 | Hartman et al. | | |
| 6,507,392 B1 | 1/2003 | Richards et al. | | |
| 6,707,609 B2 * | 3/2004 | Ryall | ................... | G02B 6/2937 |
| | | | | 359/290 |

(Continued)

FOREIGN PATENT DOCUMENTS

EP 1946034 A2 7/2008
EP 1946034 A4 7/2008

(Continued)

OTHER PUBLICATIONS https://en.wikipedia.org/wiki/Diffuco_rofloction, printod Jul. 11, 2010.

(Continued)

*Primary Examiner* — Joseph W Sanderson
(74) *Attorney, Agent, or Firm* — Jay R. Yablon

(57) ABSTRACT

Seeker optics and a related method comprising: an objective for collecting and transmitting light from a target; at least one scattering surface; and a photo detector; wherein: the light transmitted from the objective at small off-boresight target angles propagates to and impinges upon the photo detector without impinging upon the scattering surface; the light transmitted from the objective at large off-boresight target angles propagates to, impinges upon and scatters upon the scattering surface; and the light scattered by the scattering surface propagates to and impinges upon the photo detector; whereby: the target may be detected and tracked at both small and large off-boresight angles, in a wide field of regard.

30 Claims, 8 Drawing Sheets

(56) References Cited

U.S. PATENT DOCUMENTS

| | | | |
|---|---|---|---|
| 7,185,845 B1 | 3/2007 | Hartman et al. | |
| 7,530,528 B2 | 5/2009 | Jenkins et al. | |
| 7,540,449 B2 * | 6/2009 | Jenkins | F41G 7/2253 244/3.1 |
| 7,575,191 B2 | 8/2009 | Layton | |
| 7,587,109 B1 | 9/2009 | Reininger | |
| 8,071,927 B2 * | 12/2011 | Hilgemann | F41G 7/226 244/3.1 |
| 8,164,037 B2 | 4/2012 | Jenkins | |
| 8,324,543 B2 * | 12/2012 | Dryer | F41G 7/226 244/3.16 |
| 8,373,105 B2 | 2/2013 | Eiane et al. | |
| 2002/0135912 A1 * | 9/2002 | Ryall | G02B 6/2937 359/892 |
| 2005/0103986 A1 | 5/2005 | Hartman | |
| 2007/0187546 A1 | 8/2007 | Layton | |
| 2007/0290096 A1 | 12/2007 | Jenkins et al. | |
| 2008/0087761 A1 * | 4/2008 | Jenkins | F41G 7/2253 244/3.16 |
| 2009/0141343 A1 * | 6/2009 | Leard | F42C 13/02 359/359 |

FOREIGN PATENT DOCUMENTS

| | | |
|---|---|---|
| EP | 1994358 A2 | 1/2011 |
| EP | 1994358 A4 | 1/2011 |
| WO | 2007044022 A2 | 4/2007 |
| WO | 2007044922 A3 | 4/2007 |
| WO | 2008/063679 A2 | 5/2008 |
| WO | 2008/063679 A3 | 5/2008 |
| WO | 2008/063679 A9 | 5/2008 |

OTHER PUBLICATIONS https://www.physicsclassroom.com/class/refln/Lesson-1/Specular-vs-Diffuse-Reflection, printed Jul. 11, 2019.

https://www.synopsys.com/content/dam/synopsys/optical-solutions/documents/datasheets/illumination-fundamentals.pdf, downloaded Jul. 11, 2019.

https://phys.libretexts.org/Courses/University_of_California_Davis/UCD:_Physics_7C/09:_Optics/9.2:_Optics_and_Images/9.2.2:_Reflection, printed Jul. 11, 2019.

https://www.differencebetween.com/difference-between-scattering-and-vs-reflection/, printed Jul. 11, 2019.

* cited by examiner

WIDE-ANGLE SEEKER

CROSS-REFERENCE TO RELATED APPLICATIONS

This application claims benefit of provisional application U.S. 61/955,462 filed Mar. 19, 2014.

STATEMENT REGARDING FEDERALLY SPONSORED RESEARCH OR DEVELOPMENT

This invention was made with government support under contract #W31P4Q10C0113 awarded by the US Department of the Army. The government has certain rights in the invention.

BACKGROUND OF THE INVENTION

Semi-active laser seekers are widely used in missiles and guided bombs, offering the capability of high precision at a relatively low cost. A laser designator marks the target with a laser spot. The beam is modulated with a coded sequence of pulses, individualized for each target. The light scattered by the target is collected by the optics of the seeker, which produces a defocused spot on a quadrant photodetector (QPD). Location of the spot on two to four quadrants of the detector produces a decoded signal used for guiding the missile to the target. Narrow instantaneous field of view (IFOV) is required for producing reliable target tracking at high resolution. A wide field of regard (FOR), by far exceeding the typical FOV values, is required to find the target prior to precision guidance. Existing seekers use mechanical gimbals, which drives up the cost and weight, introduces potential reliability issues, and slows down the operation.

Strap-down seekers for the terminal guidance of tactical weapons offer improved reliability, reduced weight, and lower cost, compared to traditional gimbaled seekers. On the other hand, the tradeoff between wide FOR and high angular discrimination is more difficult to balance in strap-down seekers than in gimbaled seekers. In a gimbaled seeker, IFOV is dictated by the required angular sensitivity of the guidance signals, limited by the signal-to-noise ratio (SNR) of the quadrant photodetector, typically in the 6-degree to 10-degree range, while the wide FOR is provided by rotation of the camera in the gimbals. In a strap-down seeker, on the other hand, the IFOV and FOR are of the same fixed value, typically falling short of the desired FOR of 40 degrees or more. If the narrow 6-8 degree value is used for the FOR, even if locked before launch, the seeker will lose the target in the early stages of flight, thus having no means to acquire and track the target in the terminal phase. The straightforward approach to increasing the field, e.g., using a lens with a reduced focal length, at the same detector size and the same lens F-number, would reduce aperture size and light throughput, resulting in reduced SNR and compromising target tracking. Hypothetically, a larger detector, combined with presently-available optics, would offer a wider field, collecting the same number of photons and generating the same signal level as in the present gimbaled seekers. The larger detector, however, would generate more noise, again causing the SNR problem. The lower SNR results in lack of performance, including poorer target detection and tracking, reduced range, increased susceptibility to interference, and other negative effects.

Several approaches are possible in transitioning missile seekers from gimbaled operation to strap-down designs. Optical scanning methods, such as rotating prisms or programmable diffraction gratings, are two of the possible solutions to this issue. The main drawback of rotating prisms is the mechanical motion, which is slow, and these compromise reliability, increase weight, and share several other significant limitations with mechanical gimbals. Programmable diffraction gratings are unavailable or expensive if large apertures are required, and may cause significant loss of light. A new approach is needed to provide all advantages of a strap-down seeker while improving the field of regard.

Semi-active laser ("SAL") seekers are well known and described in detail in the literature. The operation of a SAL seeker system is based on a narrow, pulse-coded laser beam "painting" the target by a laser designator. The SAL seeker, located on the missile or other weapon, detects the laser illumination scattered by the target. The seeker photodetector, such as quadrant photodetector, produces raw signals that are decoded specific to a particular target, followed by signal processing that produces guidance signals to the missile, guiding it to the target according to a selected guidance method. Most existing SAL seekers typically use a two-axis gimbal system that provides a wider FOR, in addition to a narrow FOV.

The cost and complexity of SAL seekers can be reduced dramatically by transitioning future seekers from gimbal-based operation to strap-down designs. This goal is actively pursued by the U.S. aimed services. The benefits of the strap-down seeker come at a price of reduced FOR, which becomes limited to the FOV value. Because of the potential benefits, new strap-down SAL seekers, without a gimbal system, are being proposed for many missile applications.

U.S. Patent application 2007/0290096 and U.S. Pat. No. 8,164,037 (also published as EP1946034A2, EP1946034A4, U.S. Pat. No. 7,530,528, WO2007/044922A2, WO2007/044922A3) disclose several designs of strap-down seeker optics using refractive lenses with carefully-designed aberrations. A representative drawing of the invention in these documents is shown in FIG. 1. An optional concentrator 435 concentrates the energy received by the optical system. It may expand the effective field of view of the detector, concentrate light at a relatively large input aperture onto a smaller area of the detector, perform stray light rejection, athermalization, and control angular jitter. The effective defocused spot has a smooth intensity profile. Combined with the fixed effective focal length (distance from the lens to the detector), this makes significant increase of FOR (e.g., from 6-8° to ~40°) problematic due to the reduced SNR, as was discussed above.

U.S. patent application 2007/0187546 (Also published as EP1994358A2, EP1994358A4, U.S. Pat. No. 7,575,191, WO2008/063679A2, WO2008/063679A3, WO2008/063679A9) discloses a strap-down SAL seeker that includes an optical system having an engineered diffuser for transforming a laser spot into a uniform distribution of optical energy with a predetermined shape. The predetermined shape is preferably a square "top hat" or uniform scatter pattern. A representative drawing of the invention of these documents (FIG. 2) shows the uniform square "spot" at different angles to target. The main accomplishment of this invention is improved linearity of the guidance signal as a function of angular error. At wide FOR, the angular resolution still suffers from reduced SNR.

U.S. patent application 2005/0103986 discloses a system for detecting the angle of arrival of a beam of light from illuminated targets. A reflective shadow caster illuminates the front surface of a tapered fiber bundle in a manner that encodes the angle of arrival of light into quadrant intensities (FIG. 3). The fiber optic taper collects the energy from the large collection aperture and illuminates a quadrant detector, increasing the amount of light collected, and thus the signal. The near-linear angular response results in the FOR versus angular resolution tradeoff, limited by SNR similar to the above examples. Additional issues may be a mismatch between the FOR and the acceptance angle of the fibers, and relatively high cost of the fiberoptic taper.

U.S. Pat. No. 7,185,845 illustrated by FIG. 4 discloses a wide field-of-view optical system for a strap-down missile seeker with a spherical ball lens truncated to provide one or more facets on which detectors may be mounted to measure relative intensities as a blur spot image of a source of light, which may be a reflection from a laser designated target, and which moves across the detectors which may be individual elements in a quadrant detector. The design enables a wide field-of-view seeker with no moving parts. The drawback of this approach is a bulky and large ball lens, making problematic its use on small, 2.75" OD and smaller missiles. The use of multiple quadrant photo detectors complicates the circuitry and signal processing.

U.S. Pat. No. 6,507,392 illustrated by FIG. 5 discloses a laser detection system that includes a ball lens and a plurality of fiber optic bundles placed adjacent the ball lens so that incoming light rays are focused onto the bundles by the ball lens. In one particular version of the invention, the ball lens is one that can provide an almost infinite number of "principal" axes for off-axis light. Each fiber optic bundle is aimed in a different direction from each other bundle so that each bundle will have a different FOV even though the same ball lens is used to focus the incoming light rays. Because of aberrations, the physical size of the ball lens is much larger than the effective optical aperture coupled to a fiber. As a result, to collect a sufficient amount of light energy, the ball lens has to be large and heavy, similar to U.S. Pat. No. 7,185,845. The use of multiple photo detectors (fibers) also complicates the circuitry and signal processing.

U.S. Pat. No. 8,373,105 illustrated by FIG. 6 discloses laser-seeking munitions with one or more sensors and a plurality of lenses transmitting light to the sensors. Some embodiments comprise one or more baffles coupled to the plurality of lenses, the baffles configured to substantially block a portion of the plurality of lenses from transmitting light to the sensors. Some embodiments comprise a plurality of optical fibers optically coupled to the sensor(s) and the lense(s), where the fibers are configured to substantially block a portion of each of the plurality of lenses from transmitting light to the one or more sensors. The overall size of the seeker has to be large compared to the optical aperture, which precludes the use of such a seeker on a small missile while providing high light throughput. The field of view and field of regard are the same, which precludes providing a narrow IFOV required for reliable target tracking at high resolution combined with a wide FOR required to find the target prior to precision guidance.

U.S. Pat. No. 4,245,890 illustrated by FIG. 7 discloses a missile with nose in the shape of a transparent ogive window which has an index of refraction that assumes different values at different positions on the window whereas the window appears to the sensor as if it were a hemispherical window. While refracting light form the target, the window does not produce a focused spot on the sensor, and requires additional optics for operation. The additional optics, not included in U.S. Pat. No. 7,185,845, defines field of view and field of regard, and so do not provide for a wide FOR combined with a narrow IFOV.

U.S. Pat. No. 7,587,109 illustrated by FIG. 8 discloses a hybrid, wide angle imaging system. An array of Keplerian telescope objectives focuses multiple apertures of light through the tubes of a louver baffle. An image is formed on the convex surface of a fiber optic imaging taper, which transfers the image to the flat bottom of the taper where it can be viewed through an eyepiece or digitized by a detector array. This design has two major inherent limitations: 1) only a small portion of the overall optical aperture collects light from a target, so that the effective aperture is small, while the overall size and weight of the seeker optics are large compared to the useful effective aperture; and 2) the rays of light impinge on the detector in a wide range of angles of incidence, which would cause significant blue shift and compromise attempts of narrow-band filtering and solar suppression.

No design or concept of a strap-down seeker described in the literature offers a wide FOR combined with high resolution comparable that of the narrow IFOV of existing gimbaled seekers.

SUMMARY OF THE INVENTION

The present invention is for seeker optics and a related method comprising: an objective for collecting and transmitting light from a target; at least one scattering surface; and a photo detector; wherein: the light transmitted from the objective at small off-boresight target angles propagates to and impinges upon the photo detector without impinging upon the scattering surface; the light transmitted from the objective at large off-boresight target angles propagates to, impinges upon and scatters upon the scattering surface; and the light scattered by the scattering surface propagates to and impinges upon the photo detector; whereby: the target may be detected and tracked at both small and large off-boresight angles, in a wide field of regard.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

DETAILED DESCRIPTION

Figure 1:
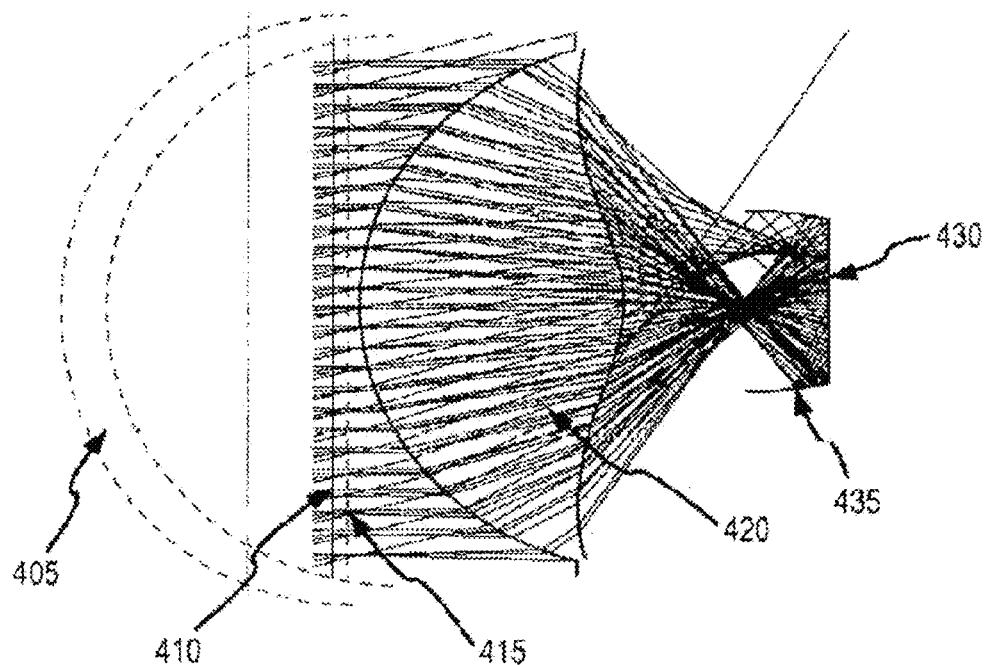
FIG. 1 is a prior art conceptual drawing illustrating an optical energy concentrator as disclosed in U.S. Patent application 2007/0290096.
Figure 2:
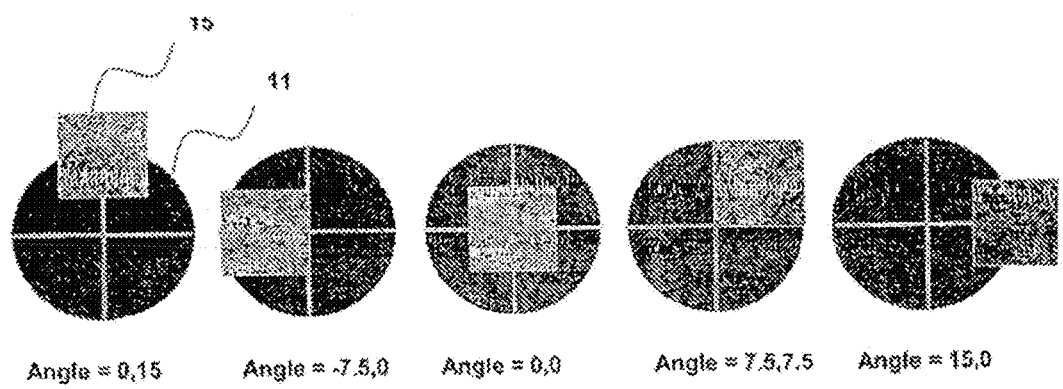
FIG. 2 is a prior art conceptual drawing illustrating a strap-down SAL seeker as disclosed in U.S. patent application 2007/0187546 including an optical system having an engineered diffuser for transforming a laser spot into a uniform distribution of optical energy with a predetermined shape.
Figure 3:
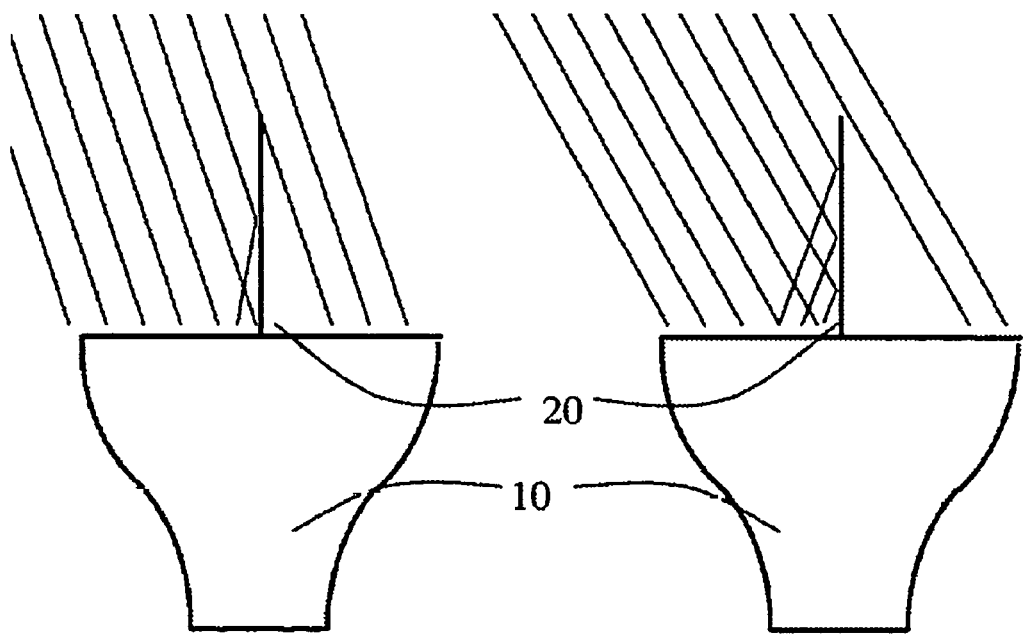
FIG. 3 is a prior art conceptual drawing illustrating a system for detecting the angle of arrival of a beam of light from illuminated targets as disclosed in U.S. patent application 2005/0103986.
Figure 4:
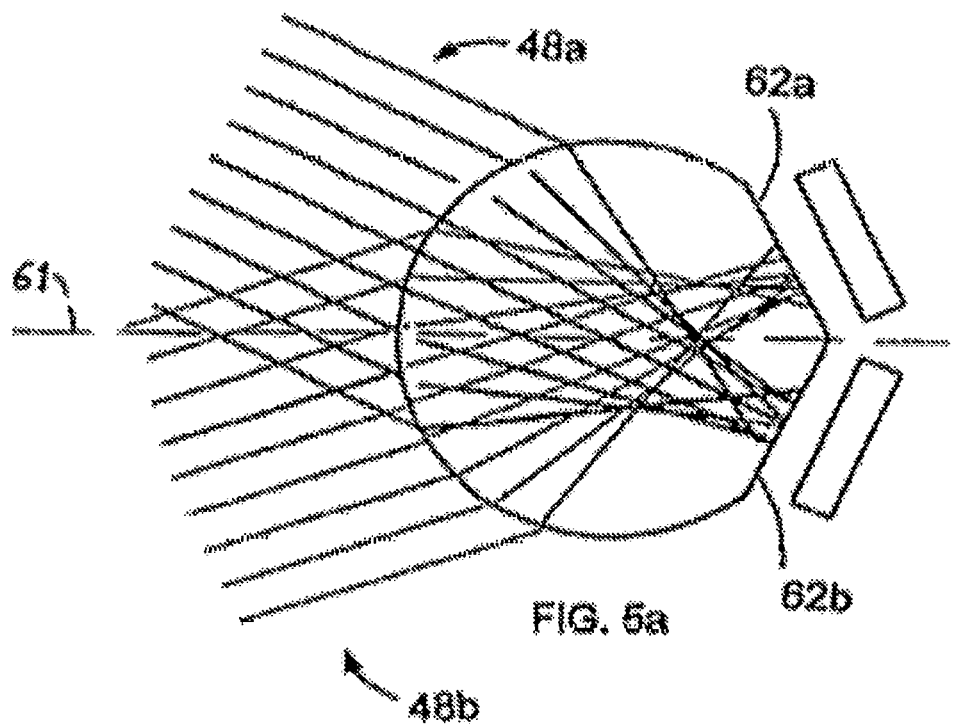
FIG. 4 is a prior art conceptual drawing illustrating a multi-faceted ball lens as disclosed in U.S. Pat. No. 7,185,845.
Figure 5:
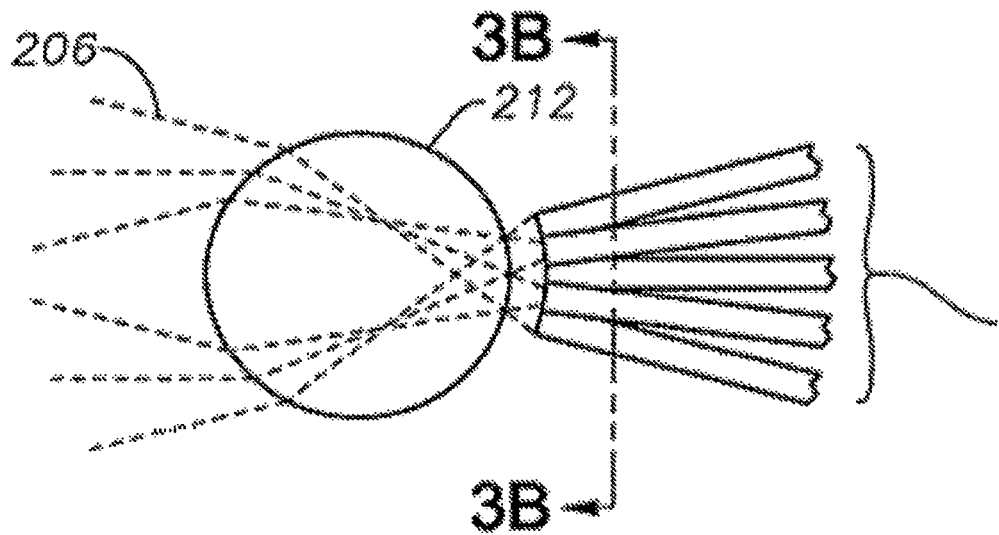
FIG. 5 is a prior art conceptual drawing illustrating a ball lens with fiber bundle is disclosed in U.S. Pat. No. 6,507,392.
Figure 6:
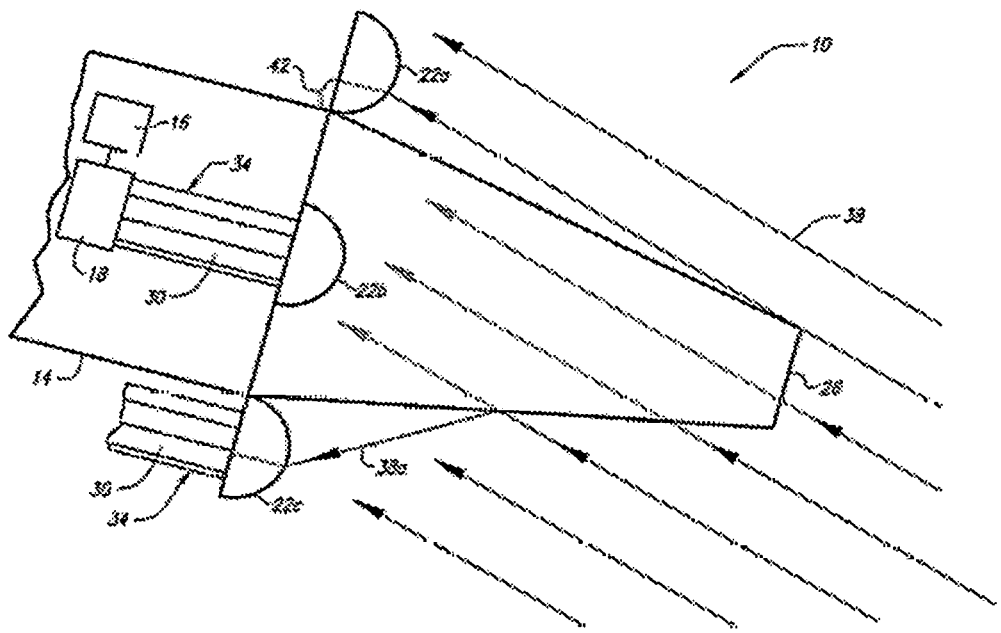
FIG. 6 is a prior art conceptual drawing of laser-seeking munitions with one or more sensors and a plurality of lenses transmitting light to the sensors, as disclosed in U.S. Pat. No. 8,373,105.
Figure 7:
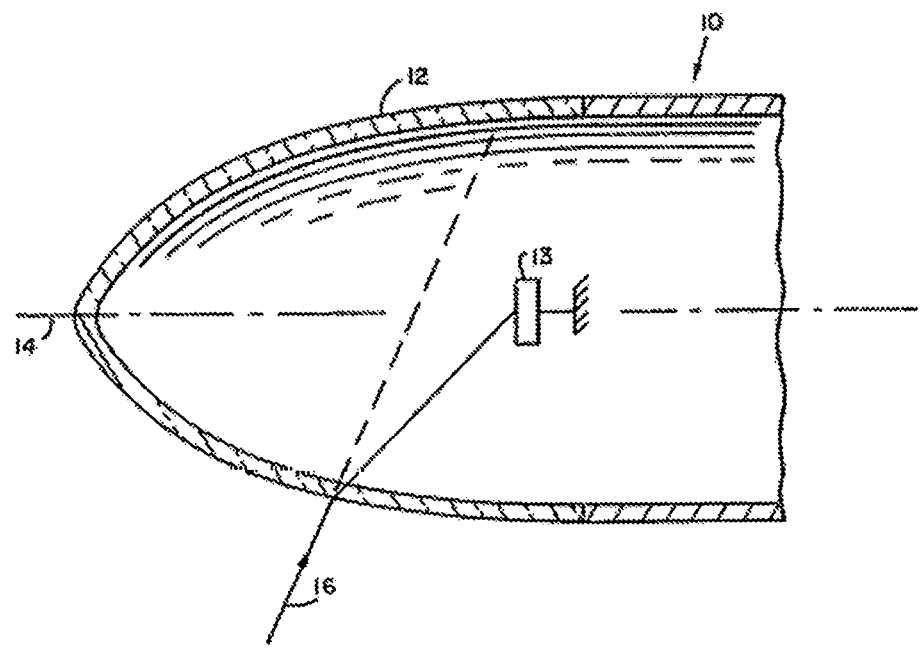
FIG. 7 is a prior art conceptual drawing of a missile nose in the shape of transparent ogive window with an index of refraction that assumes different values at different positions on the window, as disclosed in U.S. Pat. No. 4,245,890.
Figure 8:
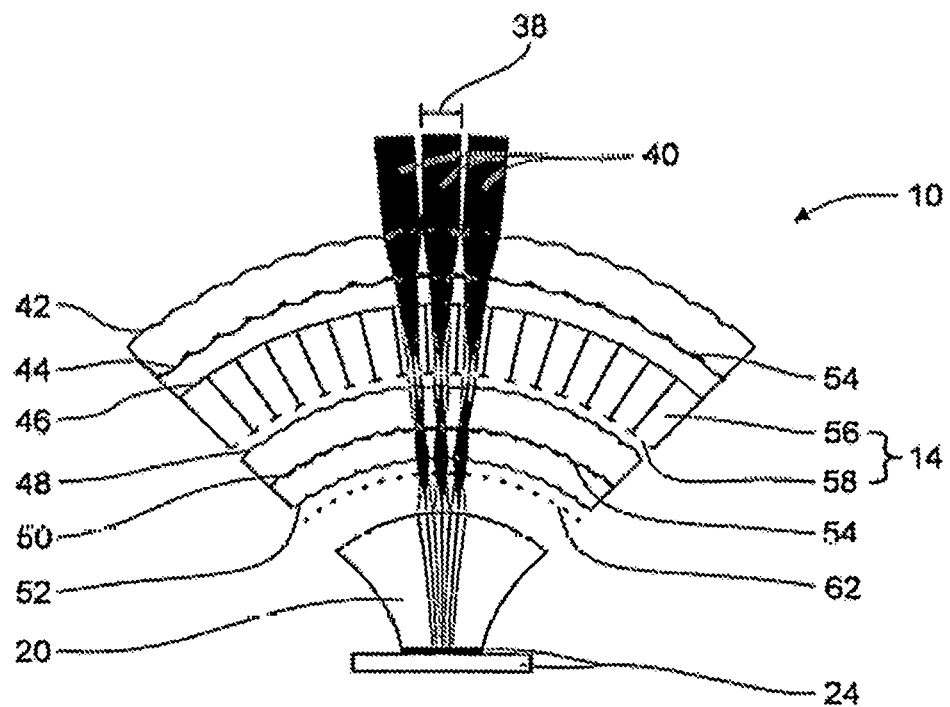
FIG. 8 is a prior art conceptual drawing of a hybrid, wide angle imaging system with an array of Keplerian telescope objectives focusing multiple apertures of light through the tubes of a louver baffle, as disclosed in U.S. Pat. No. 7,387,109.

The present invention is a missile seeker with wide-angle optics capable of acquiring and tracking targets in a wide field of regard, in a strap-down configuration with no gimbals or any other mechanical motion of any part of the seeker. At the same time, this invention provides for high angular discrimination when tracking a target in a narrow field of view near the optical axis, similar to existing gimbal-based seekers. The expanded, wide field of regard is provided in this invention by scattering surfaces placed behind the seeker objective and before the seeker detector. These scattering surfaces reflect light or infrared radiation from a target, even at large off-boresight angles, and redirect this radiation to the detector of the seeker, thus enabling detection, acquisition, and tracking of the target.

For purposes of this disclosure and its associated claims, "large" off-boresight angles are defined as angles for which light transmitted from the objective propagates to, impinges upon and scatters upon the scattering surface. Likewise, consistent with definitions which are widely-used and accepted by practitioners of the optical technology arts, as used in this disclosure and the associated claims, the word "scattering" is defined to be synonymous with the term "diffuse reflection" in which a ray incident on a surface is reflected at many angles rather than at just one angle, and does not include the circumstance—commonly referred to as "specular reflection"—in which the ray is reflected at only one angle. Therefore, by necessary implication, the term "scattering surface" as used in this disclosure and its associated claims is defined to mean a surface from which a ray is reflected in a diffuse fashion, and not in a specular fashion.

In addition, this invention provides for effective suppression of solar radiation when a target is located at a small angular distance from the Sun in the field of view of the seeker. This benefit is provided by the properties of the scattering optics of this invention, combined with an optional narrow-bandpass filter. This invention provides for an angular range of the rays in the seeker optical train that is narrow compared both to the seeker field of regard and to the numerical aperture of the seeker objective. The narrow angular range of the rays impinging on the filter minimizes the "blue shift" of the filter central wavelength induced by the angle of incidence. This, in turn, provides for narrower pass-band of the filter, which reduces the level of solar irradiation on the detector.

This invention is based on an innovative optical system that allows for high resolution in the narrow IFOV such as 6 to 8 degrees, combined with lower-resolution guidance signals in the wide FOR such as 40 degrees or more. The unique benefits of this invention provide an opportunity to solve the problems stated above, and to create a new class of strap-down seeker optics with high-resolution, narrow IFOV and wide FOR. The specific benefits include the following.

Narrow IFOV, e.g., 6 to 8 degrees, combined with wide FOR of 40 degrees or more
Extreme simplicity
No moving parts
Negligible to no power consumption
Very low cost
Negligible weight
Modular design, with no change to existing optics or detector
Potential ability to retrofit existing stockpile of missiles and guided bombs by modifying their existing seekers
Full compatibility with existing laser pulse coding schemes; no change in signal processing;
High sensitivity (slope of the guidance curve) in the narrow IFOV Principle and Operation This invention comprises an optical system where the incident light arriving from the target reaches the detector over two complementary light paths: 1) formed by an objective into a defocused spot on the quadrant detector, as in existing seekers known in the art, and 2) scattered and possibly reflected or diffracted by a specially designed structure (diffuser).

Figure 9:
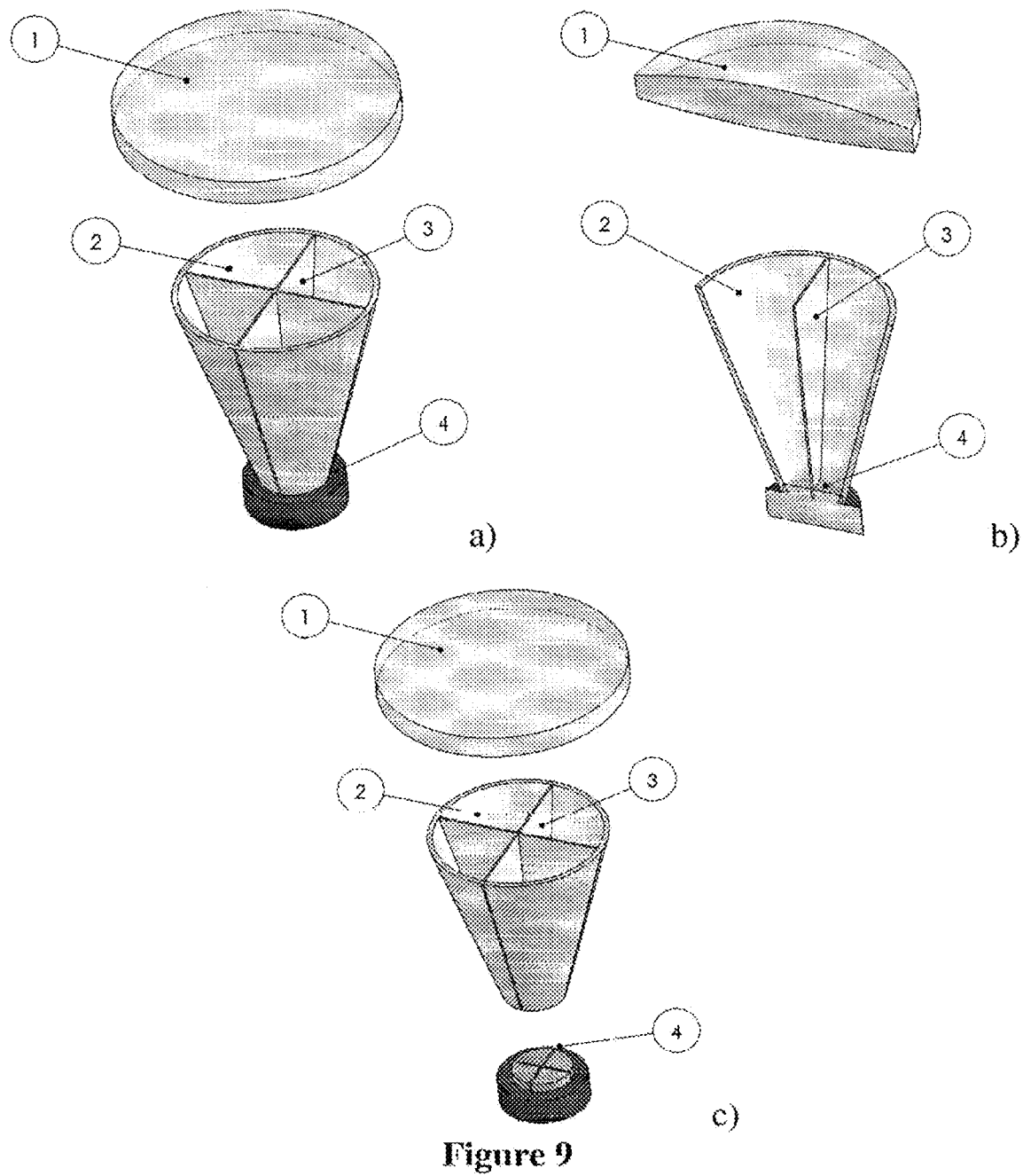
FIG. 9 is a conceptual drawing illustrating a preferred embodiment of the present invention, including: a) 3D view; b) cross-section; c) exploded view.

The conceptual drawing of this invention is shown in FIG. 9. Reference numbers in FIG. 9 are for the following: standard lens (objective) 1; rotationally symmetric scattering (reflecting) hood 2; thin-wall planar, crossed scattering (reflecting; absorbing) screen 3; standard quadrant photodetector 4. This invention includes a standard objective 1 and a standard quadrant photodiode 4, similar to those of an existing gimbaled SAL seeker, placed at the same distance from each other as in the existing seeker. While a lens (refractive) objective 1 is shown in FIG. 9, other objective types can be used in this invention without limitation, including mirror (reflective) and mixed (mirror and lens—reflective/refractive) objectives. A scattering hood 2 and two thin plane walls 3 inside the scattering hood, crossed at 90 degrees, jointly form a diffuser. The diffuser fills a part of the space between the objective 1 and the detector 4. The diffuser, particularly the hood 2, without limitation, may be rotationally-symmetric about the lens optical axis. The two crossed thin walls 3 are aligned with the linear gaps separating the quadrants of the photodetector 4. The surface of the hood 2 and the walls 3 have highly efficient scattering (reflective) properties, similar to the finish applied inside an integrating sphere. Optionally, a part of or the entire inside surface of the hood 2 and/or the crossed walls 3 are reflective and/or diffractive rather than scattering. An additional option is to make parts of the surfaces absorbing. Another additional option is to use the diffuser comprising the hood 2 alone, with no crossed walls 3. Yet another additional option is to use the diffuser comprising the crossed walls. 3 alone, with no hood.

Figure 10:
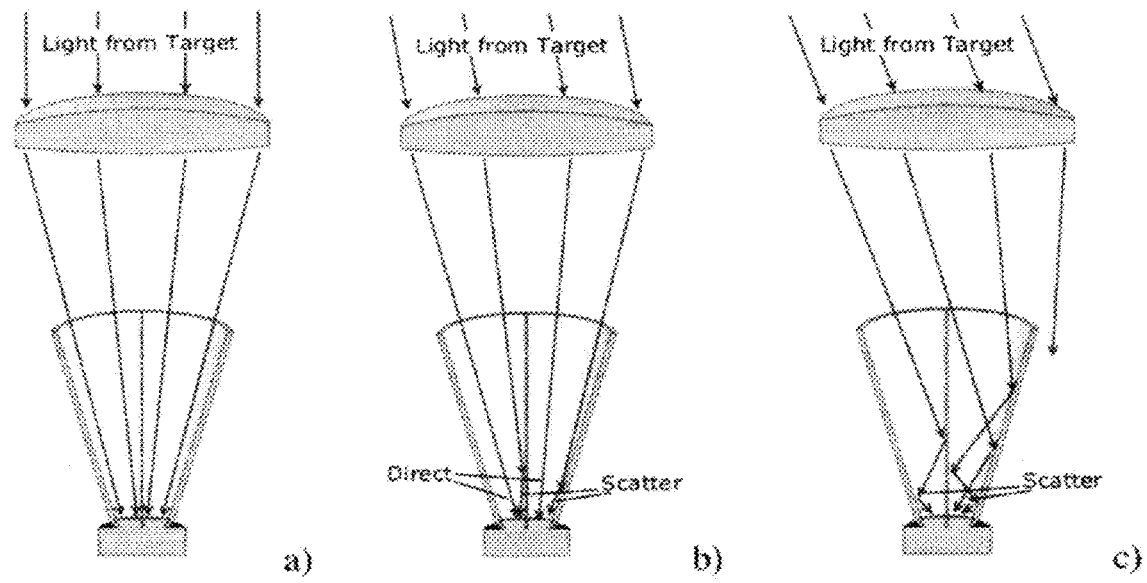
FIG. 10 is a conceptual drawing illustrating a preferred embodiment of the operation of the present invention, including: a) target on axis, inside IFOV: no scattering on diffuser; operation identical to gimbaled seeker with target found and locked; b) target off-axis, but inside IFOV: mixed operating mode with partial diffusion; c) target inside FOR but outside IFOV: all-diffusive operation.

FIG. 10 illustrates operation of this seeker optics. When the target is in the center of the IFOV, the arriving beam is parallel to the optical axis (FIG. 10, *a*). The defocused spot on the detector is produced by placing the detector closer to the lens than the lens focal length, so that the rays do not intersect with each other prior to impinging on the detector. Neither the hood nor the crossed walls of the diffuser are exposed to the converging light cone. The defocused spot is formed on the quadrant detector in the same fashion as in existing gimbaled seekers. The SNR and signal sensitivity to small angular deviations are identical to those of the gimbaled seeker.

At a small deviation of the optical axis from the direction to target, within the IFOV, the seeker operates in a mixed mode illustrated by FIG. 10, *b*. Most of the rays of the converging light cone focused by the lens still strike the detector directly, unaffected by the diffuser. Some of the rays impinge on the scattering surfaces of the diffuser, which scatter them, possibly several times, similar to an integrating sphere. Due to the high scattering efficiency of the wall coating, reaching 99% or higher, much of the scattered light reaches the detector. At the angles of incidence on the lens (target angles) approaching IFOV, the effect of scattering gradually reduces the slope of the error signal as a function of the target angle.

At target angles large compared to IFOV, all of the incident light is scattered by the diffuser (FIG. 10, *c*). The amount of light striking each quadrant of the photodetector, aligned with the respective quadrant of the diffuser, is still a function of the angle to target. For the case illustrated in FIG. 10, *c*), the right quadrant is fully filled with incident light whereas the left quadrant is filled only partially; the area left of the leftmost ray shown receives no light through the lens, but only light which has been scattered. As the direction to target varies, the differential signal produced by the quadrant detector unambiguously indicates direction to the target, even though the slope of the error-signal curve may be lower compared to target inside the IFOV. This direction to the target can be calculated from the amount of light striking each quadrant using computerized processing devices employing programming and non-transient signaling readily ascertainable by those of ordinary skill in the art.

The above discussion is a simplified illustration of the operating principle of this invention; the following offers additional illustration of the operation. However simplified, the discussion illustrates the power and flexibility of the proposed solution. While the system operation within the IFOV is identical to that of a gimbaled seeker, a dramatically wider FOR is inherently provided by this design. Moreover, the width of the FOR can be controlled easily by adjusting the geometry of the diffuser: a "taller" diffuser, filling more of the length towards the lens, will provide for a wider FOR, and vice versa. The height (length) of the flat walls may be larger or smaller compared to the hood-like part of the diffuser. The latter is not necessarily a cone; the shape can be parabolic, hyperbolic, or other, and deviating from rotationally symmetric if needed. The coating of the diffuser walls may vary over the surface, changing from scattering to reflective to absorbing to diffractive.

Jointly, these degrees of freedom in the shape of the simple diffuser offer extreme flexibility of the design, allowing for control over the FOR angle and the shape of the guidance curves—signal of the quadrant photodetector as a function of the angle of arrival of the beam from target. The use of these design variables provides for expanding FOR to 25-50 degrees and wider, combined with high discrimination in the narrow IFOV and controlled shape of the guidance curves.

Suppression of Solar Radiation

Figure 11:
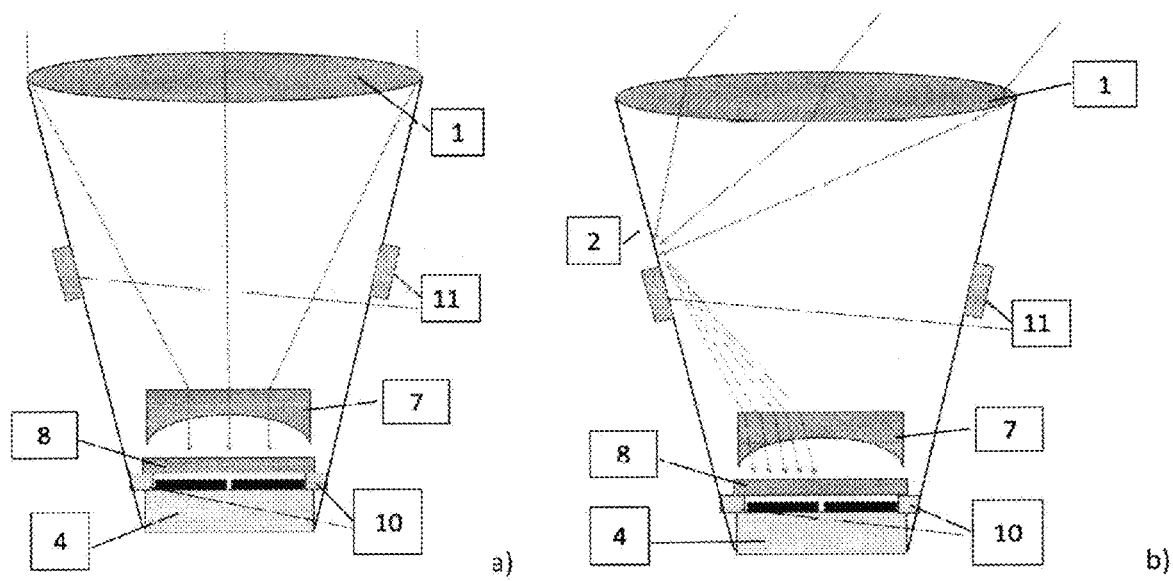
FIG. 11 is a conceptual drawing illustrating integration of an optional narrow bandpass filter in the seeker optical layout according to the present invention, including: a) boresight on target; b) target off-boresight, inside FOR but outside the IFOV.

When the Sun is in the field of regard of a seeker, the solar irradiation affects the detector. The noise increases, SNR reduces, and the detector can potentially saturate, losing gain. The solar effect can be dramatically reduced by the use of a narrow bandpass filter. Ideally, matching the pass-band to the laser wavelength and spectral width of the laser pulse would provide for maximum solar suppression, to enable seeker operation with the Sun at small angles off boresight. This is illustrated in FIG. 11.

To effectively reject solar radiation, both from the Sun in the field of regard and from a Sun-lit background, a narrow-bandpass filter or filters 8 may be inserted in the optical path of the seeker. The required pass-band needs to be narrow, e.g., no broader than 10 nm or as narrow as 2 nm around a laser wavelength such as the near-infrared 1064 nm. Of all filter types, only multilayer dielectric filters are capable of such narrow-band operation. Other filter types, including dye filter, photonic bandgap filter, quantum dot filters, and guided-mode resonant filters cannot meet this requirement, for different reasons. Multilayer dielectric filters are a mature technology, capable of providing the desired narrow pass-band, and stable against temperature and humidity variations and against shock and vibration. They have superb optical quality and are thin and lightweight.

On the other hand, dielectric multilayer filters suffer from a phenomenon known as the "blue shift". The central wavelength of a dielectric filter varies with the angle of incidence. As the angle of incidence ϕ increases (zero angle being normal incidence), the central wavelength λ shifts in the shorter (blue) direction, as follows.

$$\lambda = \lambda_{max}\sqrt{1-(n_0/n_e)^2\sin^2\phi}$$

Here $\lambda_{max}$ is the wavelength at normal incidence, $n_0$ is refractive index of the medium through which the light is propagated which for air is $n_0=1$, and $n_e$ is effective index of the coating, ranging typically from 1.7 to 2.5. For example, at 1064 nm and $n_e=2$, the shift is 1.3 nm at a 4-degree angle of incidence, 2 nm at 5 degrees, 2.9 nm at 6 degrees, and 8 nm at 10 degrees. These shifts need to be compared against the pass-band of the filter (2 to 10 nm): to avoid loss of the signal from the target, the shift cannot exceed the pass-band.

The tilt angle of a ray in the seeker optics (anywhere between objective and detector) is affected by two parameters: 1) look angle (target location in the FOR), and 2) ray angle (position) within the numerical aperture (NA) of the objective. Large numerical apertures are desirable for higher light collection efficiency. Wide FOR are desirable as well. A narrow bandpass filter may effectively reduce both the NA and the field of regard, for rays whose tilt angle causes the blue shift of the filter central wavelength outside its transmission band. For example, an 8-nm bandpass filter will limit FOR to 2*10=20 degrees and NA to sin(10 deg)=0.17, i.e., F/3 effective f-number. Narrower-band filters will reduce the FOR and NA even more.

Therefore, combining wide field of regard and high light collection efficiency with narrow-band filtering is a challenging problem that requires a creative solution.

As was already stated, the use of a bandpass filter 8 for suppressing solar irradiation is complicated by the "blue shift"—the dependence of the filter central wavelength on the angle of incidence. For example, if the goal is to ensure central wavelength shift no more than 2 nm, the respective range of angles of incidence is approximately 5 degrees. This angular range creates a constraint on possible design choices for filtering light in a seeker. The relevant requirements, combined with the filter constraint stated above, can be summarized as follows.

The angle of incidence on the filter 8 cannot exceed 5 degrees, for any ray within the light cone defined by the lens 1 numerical aperture.

The angle of incidence on the filter 1 cannot exceed 5 degrees, for any look angle within the wide FOR.

Large objective numerical aperture (low F-number value) is desired, e.g., F/1.0 or faster—for efficient light collection.

Entire aperture of the seeker should collect light from any look angle within the FOR.

No elements (e.g., filters) outside the aperture (e.g., on a dome)—to ensure small form factor and applicability to any window or dome, including small windows and domes.

Detector choice: one quadrant detector smaller than 10 mm in diameter.

All of these requirements are met by the optical layout of this invention in FIG. 11.

When the target is near boresight (FIG. 11, *a*), the seeker operates as follows. Light rays are focused by the seeker objective 1 into a converging conical beam. When the beam reaches the surface of a second lens 7, the beam has a diameter close to half the diameter of the quadrant photodiode 4—similar to the defocused spot formed on a quadrant photo diode (QPD) in a conventional seeker known in the art. The second lens 7 is a negative lens co-focal with the first objective lens 1. In other words, the first and second lenses 1 and 7 form a telescope. After second lens 7, the beam is re-collimated from conical to (substantially) parallel. As a result, all rays are incident on the filter 8 near the normal angle (zero angle of incidence), regardless of the ray position in the beam. All rays will therefore experience filtering at the same central wavelength by the filter 8 and reach the Quadrant Photodiode 4 forming a defocused spot on it.

The narrow immediate field of view can be 6 to 8 degrees. Accordingly, the angle of incidence of the re-collimated beam on the filter 8 after it is re-collimated by the second lens 7 may reach half that angle, i.e., 3 to 4 degrees. This angle falls within the 5-degree constraint discussed earlier. As a result, the filter 8 will pass the laser wavelength for all rays incident on the aperture of the objective 1 regardless of the aperture size, and at all look angles within the IFOV, thus providing effective selection of the laser pulse and rejection of the solar irradiation.

When the target is off boresight (FIG. 11, *b*), all rays incident on the aperture lens 1 are scattered on the hood wall 2 of the Diffuser. Some of the scattered light, after refraction by the second lens 7, passes through the filter 8 and impinges on the quadrant photodiode 4. The angle of those scattered rays that reach the QPD 4 is very close to the angle of the Diffuser cone. This diffuser cone in turn follows the shape of the converging beam cone of FIG. 11, a). Therefore, the scattered rays have direction angles close to those of the peripheral rays of the light cone of FIG. 11, a). As a result, after refraction by the second lens 7, the angle of incidence of the scattered rays on the filter 8 will be small. Most of these scattered rays will have angles of incidence within the 5-degree constraint, so that the laser pulse will pass the filter 8, while solar irradiation will be rejected outside the filter pass-band.

With more detailed consideration, the above discussion is more applicable to the left side of the filter 8 and QPD 4 (in FIG. 11, *b*). As we consider rays scattered farther to the right, their angles of incidence on the filter 8 become progressively larger. Eventually, the angles of incidence on the filter 8 exceed 5 degrees, and laser pulse starts experiencing attenuation by the filter. This attenuation can be used in concert with the effect of the crossed walls 3 of the Diffuser discussed in FIG. 9. Potentially, the attenuation by the filter 8 of the rays scattered to the right side of the QPD 4 can replace the crossed walls. This creates additional degrees of freedom for optimizing the seeker optics.

The second lens 7 in the proposed design does not produce an image. The requirements for its optical characteristics are quite relaxed. For reduced size and weight, the second lens 7 can be a Fresnel lens, or a high efficiency holographic lens or a diffractive optical element (DOE).

To summarize the above discussion, the scattering Diffuser jointly with the negative second lens 7 transform a ray's angle of incidence from anywhere in the field of regard, which may be wide, e.g., 25-50 degrees, into a narrow range of angles, within the 5 degree constraint for the rays that provide the guidance signals. As a result, one narrow-bandpass filter can be effective for selection of the laser wavelength, over the entire aperture and for all look angles in the wide FOR. The seeker sensor uses one standard quadrant photodiode 4 of a standard size. The use of the negative second lens 7 removes the limit on the size of the objective aperture, allowing for fast optics and high-efficiency light collection. The entire aperture collects light from all look angles. There are no components outside the objective lens 1, which ensures a small footprint on the surface of the missile and applicability to small guided missiles. Multiple seeker sensors can be used on small guided missiles, including compound-eye or distributed architecture.

This discussion shows the unique capabilities of this invention, which enables very narrow-band filtering for rejection of solar radiation while maintaining large numerical aperture with high light-collection efficiency, as well as wide FOR coverage.

Temperature Compensation of Filter Central Wavelength

The central wavelength of a dielectric filter increases with increasing temperature. A typical filter might have thermal drift of 0.02 to 0.03 nm per Centigrade. Fortunately, the blue shift causes the central wavelength to change in the opposite direction as the angle of incidence deviates from normal.

Two different holder or housing parts supporting opposite sides of the filter 8 and made of materials with different thermal coefficients of expansion (TCE) 10 can be used to athermalize the filter 8, by introducing a temperature-dependent tilt of the filter 8. In addition, athermalization can be achieved with temperature-dependent adjustment 11 of the spacing between lenses 1 and 7, which will also affect the angle of incidence of rays onto the filter 8 and thus its central wavelength, compensating the thermal drift.

Light Efficiency Optimization

Figure 12:
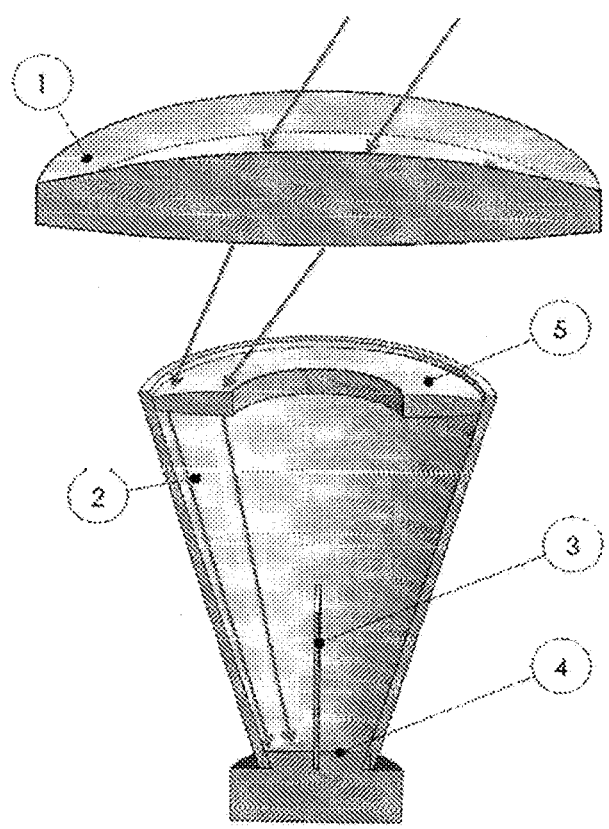
FIG. 12 is a conceptual drawing illustrating light efficiency optimization with an intermediate optical component.

To further improve acquisition range at large off-boresight look angles to the target, one may optionally introduce an additional optical relay component 5 indicated in FIG. 12. The optical relay component 5 shows open aperture in the center, which ensures a reduced effect on the focused beam when the target is near boresight. At significant look angles, the optical relay component 5 deflects (bends) at least some of the rays, specifically those passing into the peripheral regions of the hood 2, such as shown in FIG. 12, so that they impinge on the detector rather than on the conical wall/ scattering surface, or impinge on the conical wall/scattering surface closer to the detector, which will reduce light absorption loss and increase the light efficiency. Numeric modeling of the invention supports this prediction. The simple aperture, or hole, in the center of the optical relay component 5 is not the only envisioned implementation of this approach. Equally effective is an optical relay component 5 comprising a lens flattened on both surfaces near its center. A more general implementation for optical relay component 5 is an aspheric lens whose surface curvature (and power) is low near center and increases out into the periphery. Furthermore, a diffractive optical element, e.g., a holographic lens, can serve as the optical relay component 5 to maximize light efficiency and thus acquisition rage of the seeker at large off-boresight angles.

The additional optical relay component 5 enables improved acquisition range, higher signal to noise ratio, and enhanced overall seeker performance.

Figure 13:
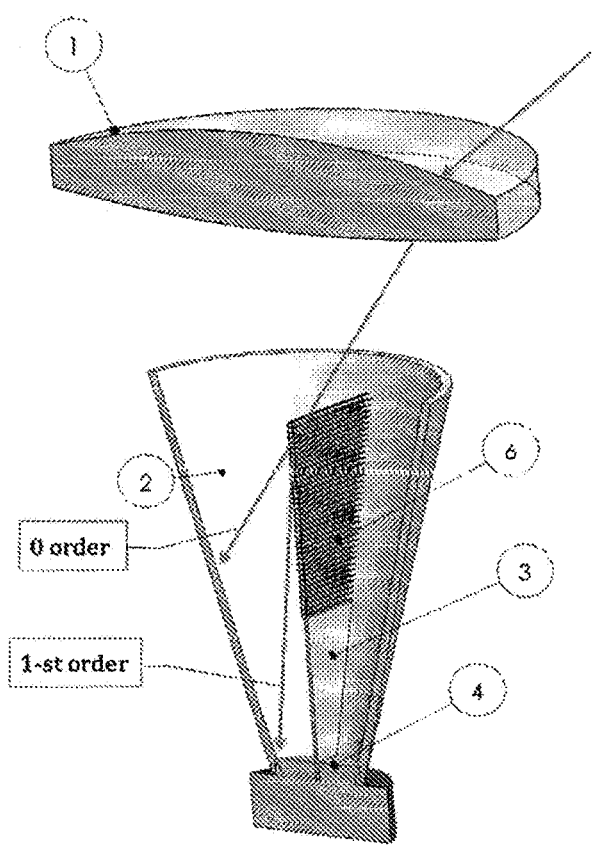
FIG. 13 is a conceptual drawing illustrating light efficiency optimization with a diffractive optical component.

FIG. 13 depicts another embodiment of the invention with enhanced light efficiency. The crossed plane walls comprise a scattering section 3 as in FIG. 9 spanning from near the quadrant photodetector 4 towards the objective 1 but not reaching the objective 1. Closer to the objective 1 each of the crossed walls 3 continues into a coplanar diffraction grating 6. The diffraction grating has its period (pitch) such that at least the 1-st diffraction order is present at large off-boresight target look angles, diffracted towards the quadrant detector. This 1-st diffraction order may disappear at low off-boresight target angles. At large off-boresight angles, the 1-st diffraction order increases the amount of light received by the quadrant photodetector, which also enhances the light efficiency.

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

I claim:

1. Seeker optics comprising:
    an objective for collecting and transmitting light from a target;
    at least one scattering surface; and
    a photo detector; wherein:
    the light transmitted from said objective at small off-boresight target angles propagates to and impinges upon said photo detector without impinging upon said scattering surface;
    the light transmitted from said objective at large off-boresight target angles propagates to, impinges upon and scatters upon said scattering surface; and
    the light scattered by said scattering surface propagates to and impinges upon said photo detector; whereby:
    the target may be detected and tracked at both small and large off-boresight angles, in a wide field of regard.

2. The seeker optics of claim 1, wherein said photo detector is a quadrant photo detector, and wherein the direction to the target is deduced via a computerized device from the amount of light striking each said quadrant.

3. The seeker optics of claim 2, said at least one scattering surface comprising crossed thin walls aligned with the gaps separating said quadrants of said photo detector.

4. The seeker optics of claim 3, said crossed thin walls comprising coplanar diffraction gratings forwardly disposed toward said objective; wherein:
    light is diffracted rather than absorbed by said diffraction gratings; and
the amount of light reaching said photo detector from the large off-boresight target angles is thereby increased.

5. The seeker optics of claim 1, said at least one scattering surface comprising a scattering hood.

6. The seeker optics of claim 5, said scattering hood comprising a cross section selected from the cross-sectional group consisting of: a cone, a parabola, and a hyperbola.

7. The seeker optics of claim 1, further comprising:
    a bandpass filter optically disposed between said objective and said photo detector; wherein:
    the light scattered by said scattering surface propagates to and impinges upon said bandpass filter with an angular range narrower than a field of regard (FOR) of said seeker optics and narrower than a numerical aperture of said objective;
    the light scattered by said scattering surface is partially transmitted to said photo detector by said bandpass filter in a narrow spectral pass-band around a central wavelength of said filter, said central wavelength shifted by said bandpass filter from a variation of an angle of incidence upon said filter; and
    said variation of the angle of incidence is reduced due to said narrower angular range of the light scattered by said scattering surface; whereby:
transmission of the light from the distant target is maximized and solar irradiation of said detector is minimized.

8. The seeker optics of claim 7, further comprising:
    a negative lens co-focal with said objective and optically disposed between said objective and said bandpass filter; wherein:
    said negative lens collimates all of the light reaching said filter to within about five (5) degrees of a normal angle to said filter; and
    all of the light reaching said filter thereby experiences filtering proximate around said central wavelength of said filter; whereby:

any blueshift variation in said central wavelength which may be a function of angle of incidence upon said filter, is minimized.

9. The seeker optics of claim 8, further comprising:
a housing for said seeker optics comprising materials which adjust a spacing between said objective and said negative lens in response to changes in temperature and thereby alter the angle of incidence the light onto the filter and thus said central wavelength of said filter; wherein:
the lens spacing adjustment offsets any temperature-dependent change in said central wavelength.

10. The seeker optics of claim 7, further comprising:
at least two different parts of a connection between said bandpass filter and a housing for said seeker optics comprising different thermal coefficients of expansion and thereby tilting said filter in response to changes in temperature; wherein:
the filter tilting offsets any temperature-dependent change in said central wavelength.

11. The seeker optics of claim 7, said bandpass filter comprising a dielectric filter.

12. The seeker optics of claim 11, said dielectric filter comprising a multilayer dielectric filter.

13. The seeker optics of claim 1, further comprising:
an optical relay component for deflecting light passing into peripheral regions of said scattering surface to impinge upon said detector rather than upon said scattering surface, or to impinge upon said scattering surface but closer to the detector; whereby:
light loss due to absorption by said scattering surface is reduced and the amount of light reaching the photo detector is thereby increased.

14. The seeker optics of claim 13, said optical relay component selected from the optical relay group consisting of: a peripheral element with an aperture in a center thereof; a lens flattened on both surfaces near its center; an aspheric lens with a low surface curvature near center and increasing near the periphery; a diffractive optical element; and a holographic lens.

15. The seeker optics of claim 1, wherein because said scattering surface diffusely reflects incident light rays at multiple angles, light which would not otherwise reach said photo detector if said surface was specularly reflective, is enabled to reach said photo detector, thereby increasing the angle of light reaching said photo detector from large off-boresight target angles.

16. A method for using seeker optics to detect and track a target at both small and large off-boresight angles, in a wide field of regard, said method comprising:
collecting and transmitting light from the target using an objective of said seeker optics; propagating to and impinging upon a photo detector of said seeker optics, the light transmitted from said objective at small off-boresight target angles, without the light impinging upon at least one scattering surface of said seeker optics;
propagating to, impinging upon and scattering upon said scattering surface, the light transmitted from said objective at large off-boresight target angles; and
propagating to and impinging upon said photo detector, the light scattered by said scattering surface.

17. The method of claim 16, wherein said photo detector is a quadrant photo detector, further comprising deducing the direction to the target from the amount of light striking each said quadrant, using a computerized device.

18. The method of claim 17, further comprising:
providing said at least one scattering surface with crossed walls; and
aligning said crossed walls with linear gaps separating said quadrants of said photo detector.

19. The method of claim 18, further comprising increasing the amount of light reaching said photo detector from the large off-boresight target angles, by:
providing said crossed walls with coplanar diffraction gratings forwardly disposed toward said objective; and
said diffraction gratings diffracting rather than absorbing light.

20. The method of claim 16, further comprising providing said at least one scattering surface comprising a scattering hood.

21. The method of claim 20, said scattering hood comprising a cross section selected from the cross-sectional group consisting of: a cone, a parabola, and a hyperbola.

22. The method of claim 16, further comprising maximizing transmission of the light from the distant target and minimizing solar irradiation of said detector, by:
optically disposing a bandpass filter between said objective and said photo detector; propagating to and impinging upon said bandpass filter with an angular range narrower than a field of regard (FOR) of said seeker optics and narrower than a numerical aperture of said objective, the light scattered by said scattering surface;
partially transmitting the light scattered by said scattering surface to said photo detector by said bandpass filter in a narrow spectral pass-band around a central wavelength of said filter, said bandpass filter shifting said central wavelength from a variation of an angle of incidence upon said filter; and
reducing said variation of the angle of incidence due to said narrower angular range of the light scattered by said scattering surface.

23. The method of claim 22, further comprising minimizing any blueshift variation in said central wavelength which may be a function of angle of incidence upon said filter, by:
optically disposing a negative lens co-focal with said objective between said objective and said bandpass filter;
said negative lens collimating all of the light reaching said filter to within about five (5) degrees of a normal angle to said filter; and
all of the light reaching said filter thereby experiencing filtering around said central wavelength of said filter.

24. The method of claim 23, further comprising using a lens spacing adjustment for offsetting any temperature-dependent change in said central wavelength, by:
altering the angle of incidence the light onto the filter and thus said central wavelength of said filter, using a housing for said seeker optics comprising materials for adjusting a spacing between said objective and said negative lens in response to changes in temperature.

25. The method of claim 22, further comprising using filter titling tilting for offsetting any temperature-dependent change in said central wavelength, by:
tilting said filter in response to changes in temperature, using at least two different parts of a connection between said bandpass filter and a housing for said seeker optics comprising different thermal coefficients of expansion.

26. The method of claim 22, said bandpass filter comprising a dielectric filter.

27. The method of claim 26, said dielectric filter comprising a multilayer dielectric filter.

28. The method of claim 16, further comprising reducing light loss due to absorption by said scattering surface and increasing the amount of light reaching the photo detector, by:

deflecting light passing into peripheral regions of said scattering surface to impinge upon said detector rather than upon said scattering surface, or to impinge upon said scattering surface but closer to the detector, using an optical relay component therefor.

29. The method of claim 28, said optical relay component selected from the optical relay group consisting of: a peripheral element with an aperture in a center thereof; a lens flattened on both surfaces near its center; an aspheric lens with a low surface curvature near center and increasing near the periphery; a diffractive optical element; and a holographic lens.

30. The method of claim 16, wherein the angle of light reaching said photo detector from large off-boresight target angles is increased by enabling light to reach said photo detector which would not otherwise reach said photo detector if said surface was specularly reflective, because of said scattering surface diffusely reflecting incident light rays at multiple angles.

* * * * *